United States Patent [19]
Maselli

[11] 3,936,948
[45] Feb. 10, 1976

[54] METHOD FOR DETERMINING AZIMUTHAL DIRECTION RELATIVE TO TRUE NORTH

[75] Inventor: George P. Maselli, Chelmsford, Mass.

[73] Assignee: Raytheon Company, Lexington, Mass.

[22] Filed: Sept. 14, 1973

[21] Appl. No.: 397,558

Related U.S. Application Data

[63] Continuation of Ser. No. 175,854, Aug. 30, 1971, abandoned.

[52] U.S. Cl. ................................. 33/301; 33/324
[51] Int. Cl. ................................. G01c 19/38
[58] Field of Search ............. 33/301, 324, 322, 318

[56] References Cited
UNITED STATES PATENTS

| | | | |
|---|---|---|---|
| 3,222,795 | 12/1965 | Gevas | 33/301 |
| 3,330,945 | 7/1967 | Gevas | 33/322 |
| 3,561,129 | 2/1971 | Johnston | 33/324 |
| 3,753,296 | 8/1973 | VanSteenwyk | 33/324 |

Primary Examiner—William D. Martin, Jr.
Attorney, Agent, or Firm—Richard M. Sharkansky; Philip J. McFarland; Joseph D. Pannone

[57] ABSTRACT

Disclosed herein is a method for determining azimuthal direction relative to true north using gyroscopic apparatus. The input axis of a gyroscope is rotated at a substantially constant rate about the local vertical axis. A series of precessional rates at the gyroscope's output axis is measured as the input axis rotates through a predetermined portion of each half revolution. The predetermined portion of each half revolution of the input axis is in known relationship to the heading or reference being determined. Each difference in successively measured ones of the series of precessional rates is filtered to reduce the effect of drift within the gyroscope and thereby accurately determine the azimuthal direction of such heading relative to true north.

10 Claims, 5 Drawing Figures

METHOD FOR DETERMINING AZIMUTHAL DIRECTION RELATIVE TO TRUE NORTH

This is a continuation of application Ser. No. 175,854 filed Aug. 30, 1971 now abandoned.

BACKGROUND OF THE INVENTION

This invention relates generally to a method for determining azimuthal direction and more particularly to a method for determining azimuthal direction relative to the earth's true north using gyroscopic apparatus.

As is known, gyroscopic apparatus have been used for determining azimuthal direction relative to true north where, for example, the accuracy attainable with a magnetic compass is inadequate. The use of such apparatus is based on the fact that, because the earth rotates about the true north-south axis, there will be no component of the earth's rotational rate about the east-west axis. Consequently, a gyroscope having an input axis maintained orthogonal to the earth's vertical axis together with mutually orthogonal spin axis and output axis may be used to determine the north-south axis. This is so because, absent any error within such gyroscope, the amount of precession at the output axis will be zero when the input axis is aligned with the east-west axis. In any practical application, however, there are developed within the gyroscope apparatus torques attributable to, inter alia, imperfections in gimbal bearings of the apparatus. Such torques result in precessional rates (i.e. drifts) at the output axis which are indistinguishable from precessional rates attributable to the earth's rotation. Because the amount of drift is generally unknown the accuracy in measuring azimuthal direction with such a gyroscope may, in some applications, be unacceptable.

One method for improving the azimuthal direction measuring accuracy using gyroscopic apparatus has been to initially align the input axis of such gyroscope along the east-west axis, the latter such axis being determined by detecting the position of the input axis where the precessional rate at the output axis is zero and then, after reversing the direction of spin motor drive of the gyroscope's rotor, to realign the position of the input axis so that the precessional rate at the output axis is again zero. Such method assumes that the drift of the gyroscope will not significantly change after the direction of spin of the rotor is reversed. It follows, then, that the effect of drift may therefore be cancelled by assuming that the mean direction of the two alignments of the input axis is coaxial with the true east-west axis. The reversal of spin direction, however, may, unless an extremely stable gyroscope is used, give rise to unwanted torques which cause the drift in the gyroscopic apparatus to change after reversal. The assumption on which such method is based may therefore be invalidated. A second method is sometimes used to determine azimuthal direction relative to true north is to initially align the input axis of the gyroscope along an estimate of the earth's true east-west axis and, while so aligned, to measure the precessional rate at the output axis after the gyroscope has "settled out" (i.e. reached a steady state condition). The input axis may then be realigned 180° from the initial alignment and the precessional rate again measured after the gyroscope has settled out. Therefore, with the assumption that the drift of the gyroscopic apparatus does not change between the first and second measurement, such drift can be calculated and its effect compensated to arrive at a true indication of the precessional rate of the output axis attributable to the earth's rotation. Such method, however, requires, typically, a ten minute "settling time" at each alignment position in order to determine the azimuthal direction to an accuracy within a quarter of a degree. Consequently, a relatively expensive gyroscope with low drift within such settling time must be used. Also, the realignment of the input axis will, because of rotational accelerations exerted on the gyroscope by such realignment procedure, develop forces within the gyroscopic apparatus, which inter alia, result in concomitant changes in the drift of such apparatus. The assumption on which the mmeasurement accuracy method is based thereby is invalidated.

SUMMARY OF THE INVENTION

With the background of the invention in mind, it is an object of this invention to provide a method using inexpensive gyroscopic apparatus for determining, in a given time period, an azimuthal direction of a reference axis fixed in a gyro mounting about the local vertical with a degree of accuracy herebefore attainable only with expensive gyroscopic apparatus.

This and other objects of the invention are attained generally by continuously rotating, at a substantially constant rate relative to the earth, the spin reference axis of a gyroscope in a plane disposed perpendicular to the local vertical. The input axis of the gyroscope is also disposed in the plane just mentioned but is orthogonal to the spin reference axis. In order to reduce the effect of high frequency drifts within the gyroscope a series of precessional torques developed about an output axis, (such axis being mutually orthogonal to the spin reference axis and the input axis) are measured over a predetermined portion of each half revolution of such input axis. Because the housing of the gyroscope is rotated at a constant rate the just-mentioned measurements are always taken when the housing of the gyroscope is in a steady state condition, there is no need for waiting for the gyroscope to settle out before each series of measurement of the precessional torques at the output axis is made. The predetermined portion of each half revolution of the input axis in which measurements are made is in known relationship with the reference direction being determined. The difference in the precessional torques for successive series thereof is used to determine the azimuthal direction of such reference direction relative to true north. In order to reduce the effect of long term drifts within the gyroscope each successive one of such differences is averaged.

BRIEF DESCRIPTION OF THE DRAWINGS

Other objects and many of the attendant advantages of the invention will be readily appreciated as the same becomes better understood by reference to the following detailed description when considered in connection with the accompanying drawings wherein.

DESCRIPTION OF THE PREFERRED EMBODIMENTS

Figure 1:
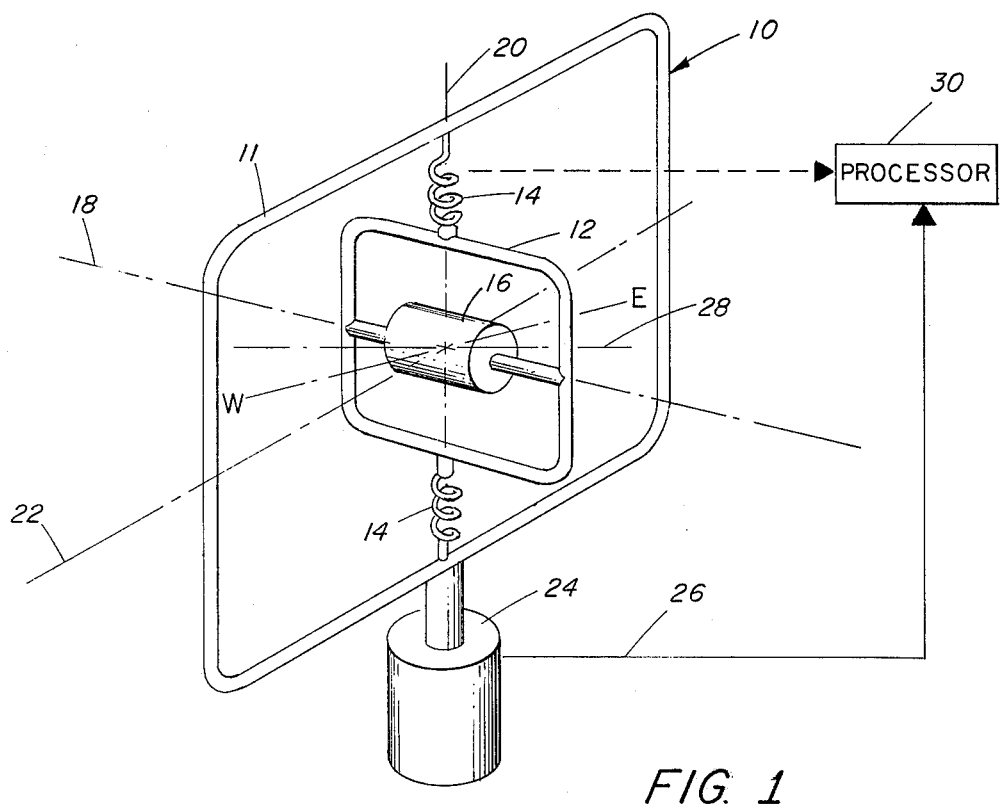
FIG. 1 shows a diagram of gyroscopic apparatus greatly simplified for practicing the invention.
Figure 2:
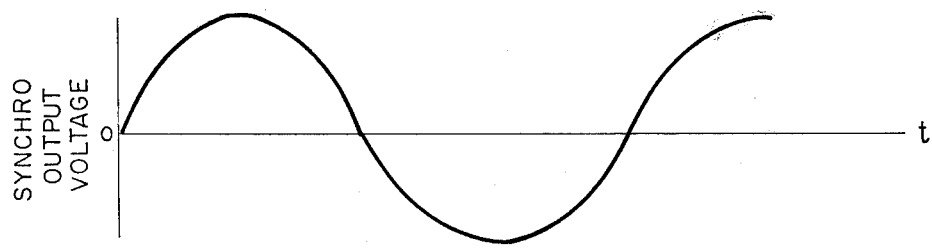
FIG. 2 shows a curve representative of the pickoff signal at the output axis of a gyroscope in FIG. 1 operating under ideal conditions.

Referring now to FIG. 1, a conventional rate sensing gyroscope 10 has been selected to illustrate the principles of the invention. Thus, such gyroscope has a case 11 and at least one gimbal 12, such gimbal being suitably connected to the case through suitable restraint means 14, as shown. As in any gyroscope the degree of restraint provided by such restraint means is a compromise between the amount of angular deflection required for proper operation of the gyro pickoff and the amount of angular deflection permitted to attain any desired degree of precision with the method contemplated herein. A rotor 16 is rotatably mounted within gimbal 12 by suitable bearings (not shown). The rotor is caused to spin about spin axis 18 by any convenient means (not shown). The spin axis 18 is orthogonal to an output axis 20, such output axis being coaxial with the axis of the restraint means 14, as shown. An input axis 22 is mutually orthogonal to the spin axis 18 and the output axis 20. As is known, a rotational rate about input axis 22 will cause a precessional rate (and accompanying restraint torque) to be developed about output axis 20. The amount of such restraint torque here may be determined by any conventional angular displacement transducer, as a conventional pickoff 32 as shown in FIG. 2. Thus, when the case 11 is fastened to the rotor 23 of a synchronous motor 24 and the input axis 22 is here preferably maintained orthogonal to the local vertical axis by means of a suitable platform 27, fixed relative to the earth for supporting the stator 25 of such motor, and the case 11 is rotated about such vertical axis at a constant rate (preferably one revolution per minute) by means of synchronous motor 24, the voltage developed at the output of the pickoff 32 will be proportional to the precessional torque developed at the output axis 20. FIG. 2 shows a waveform representative of the output of the pickoff 32 when the gyroscope 10 has no drifts. Such waveform is generally sinusoidal, having a maximum and a minimum value when the input axis 22 is, respectively, aligned with the local north and south axis (not shown in FIG. 1) and a zero value when the input axis 22 is aligned along the local east-west axis, E-W. Synchronous motor 24 is adapted by any convenient means, as by mounting a pair of contacts to the rotor 23 and the stator 25 in a conventional way, to transmit a pulse on line 26 each time the input axis 22 is parallel to the reference direction 28. It is preferable that the reference direction 28 be approximately east-west so that such pulse is transmitted when the input axis 22 is approximately aligned along the east-west axis E-W. Such alignment may be made with a magnetic compass. Consequently, if, at the time a pulse is transmitted on line 26, the voltage produced at the output of the pickoff 32 is zero, the input axis 22 must be parallel to the east-west axis E-W in the absence of any drifts developed within gyroscope 10. The distinction between east or west may be made by any convenient means, such as a magnetic compass. In the absence of any drifts, the deviation of the reference direction 28 from east-west may be measured by measuring the voltage at the output of the pickoff 32 when there is a pulse transmitted on line 26.

Figure 3:
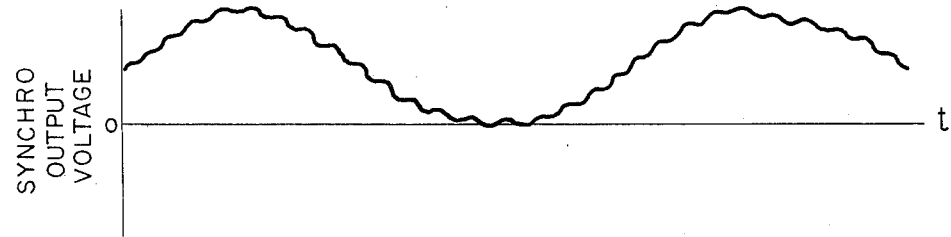
FIG. 3 shows a curve representative of the pickoff signal at the output axis of a gyroscope in FIG. 1 operating under practical conditions.

As is known, the output signal of the pickoff 32 is, in any practical situation, not perfectly sinusoidal, as shown in FIG. 2. Because of long term and high frequency drifts the signal is modulated so that the output signal typically appears as shown in FIG. 3. It is noted in such case that even if the reference direction 28 is aligned with the east-west axis, E-W, the voltage at the output of the synchro is not zero. This is so because of the long term drift in the gyroscope. The effect of such drift may be cancelled if such drift does not significantly vary in one-half revolution of the input axis by subtracting successively measured voltages when successive pulses are transmitted on line 26. When the reference direction 28 is aligned along the east-west axis E-W, such voltage difference under the above assumption will be zero. Likewise, the voltage difference will be of known relationship to the angular deviation of the reference direction 28 from the east-west axis E-W.

Figure 4:
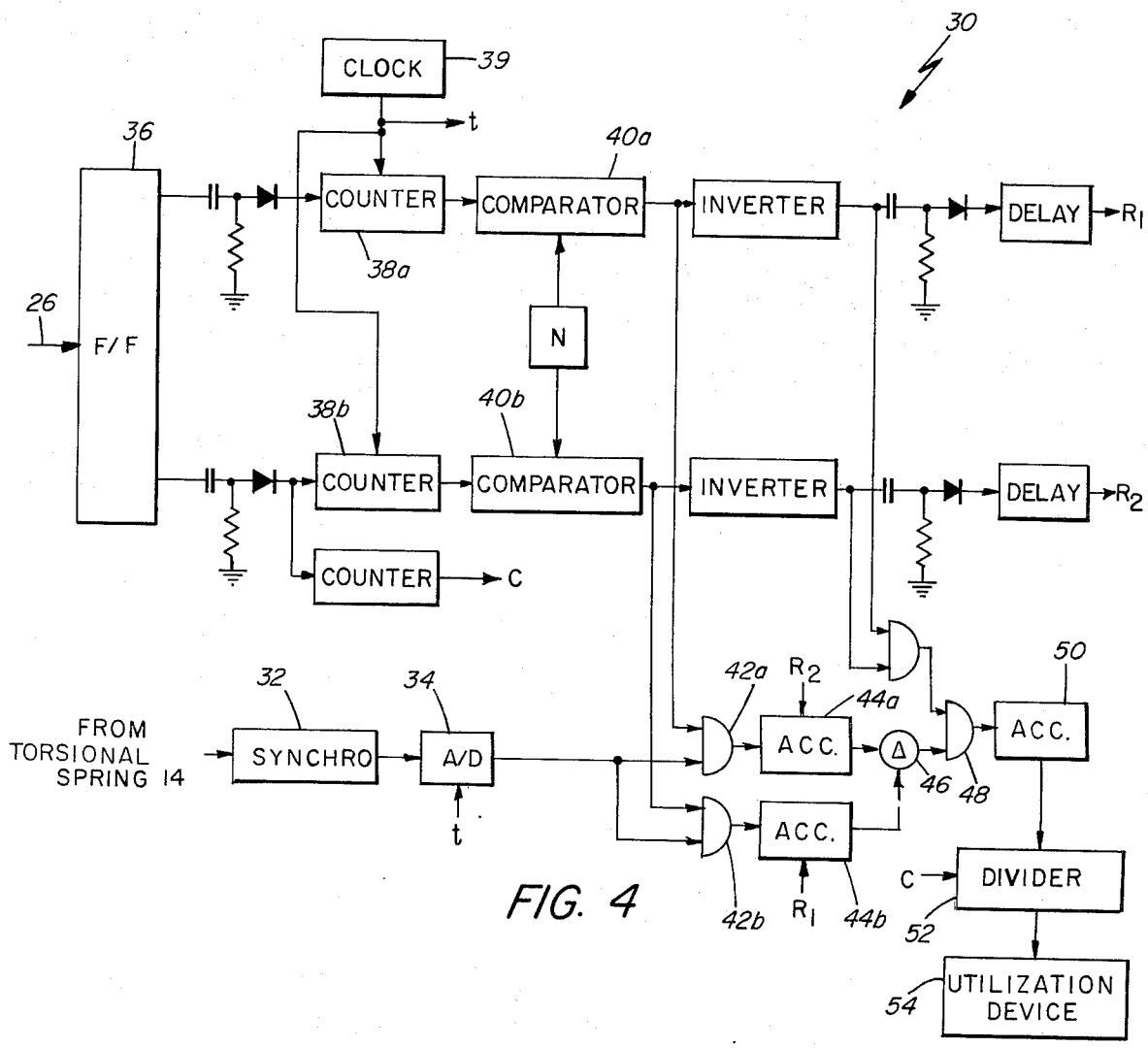
FIG. 4 shows the details of the processor in FIG. 1.

Processor 30, the details of which are shown in FIG. 4, is used to reduce the effect of the high frequency and low term drifts. In particular, the effect of the high frequency drifts are reduced by picking off and processing a series of signal levels at successive intervals of time in which the input axis is rotated through a predetermined angle, $\theta_i$; after having been codirectional with the reference direction 28. The effect of the long term drifts is reduced by detemining the differences among the plurality of signal levels at the ends of successive half revolutions of the input axis 22 and averaging successive ones of such differences each half revolution thereafter. One way of viewing the functions of the processor 30 is to consider it as determining an "average" pickoff signal level at the output axis 20 each time the input axis is "aligned" with the reference direction 28.

Figure 5:
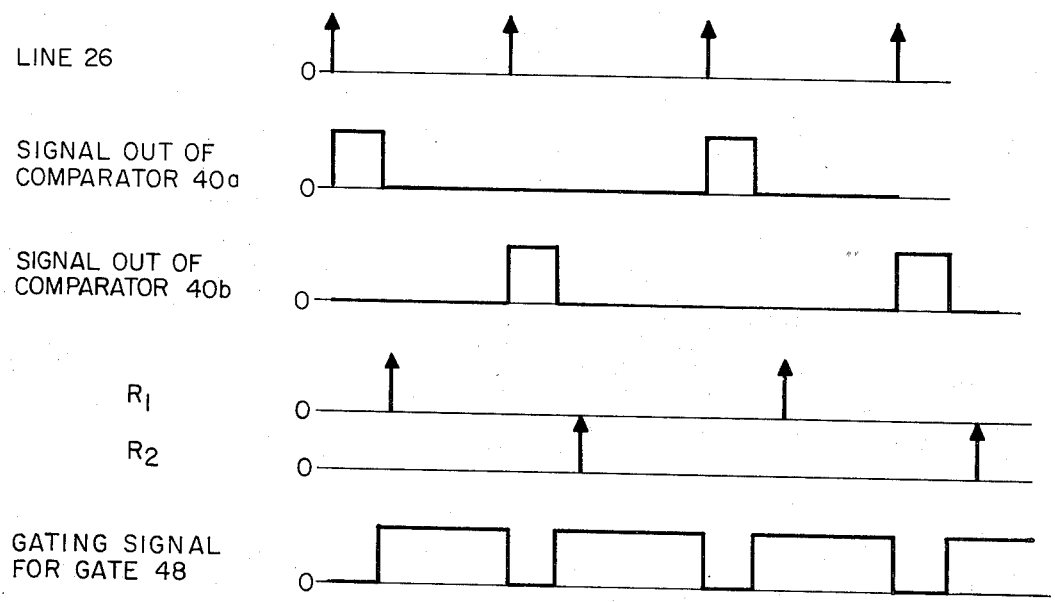
FIG. 5 shows a timing diagram representative of the operation of the processor in FIG. 4.
Figure 1:
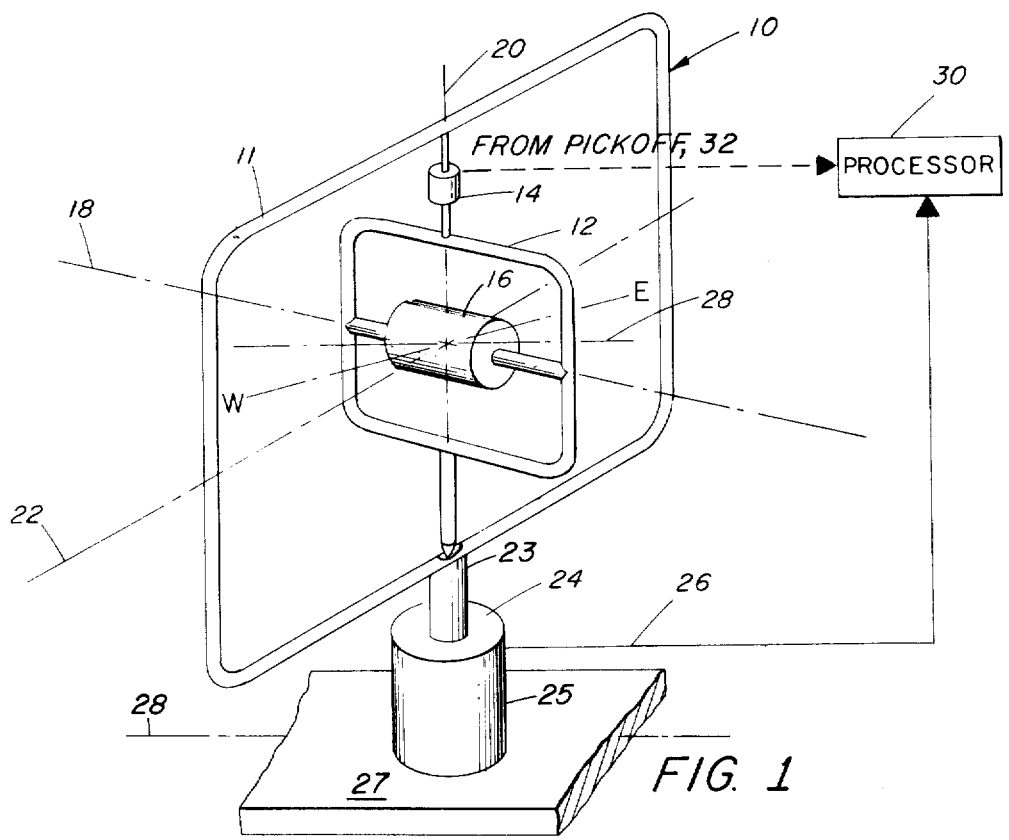
Figure 2:
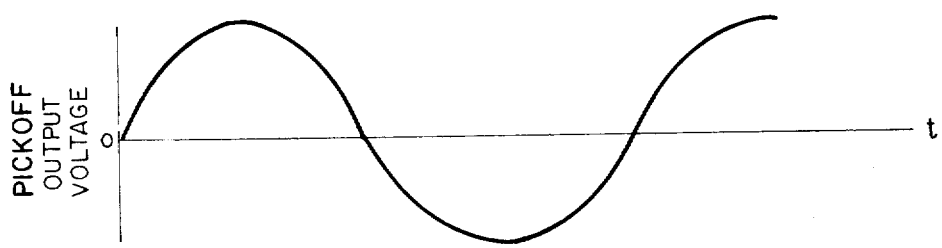
Figure 3:
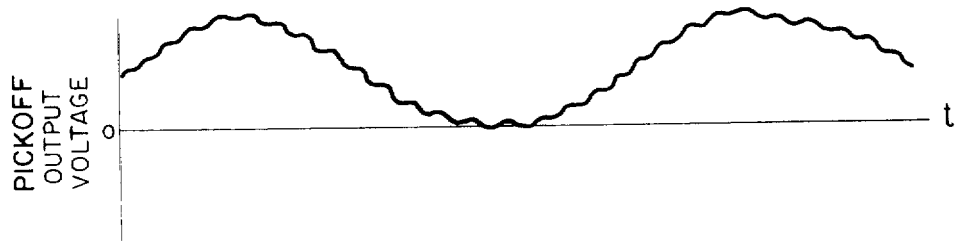
Figure 4:
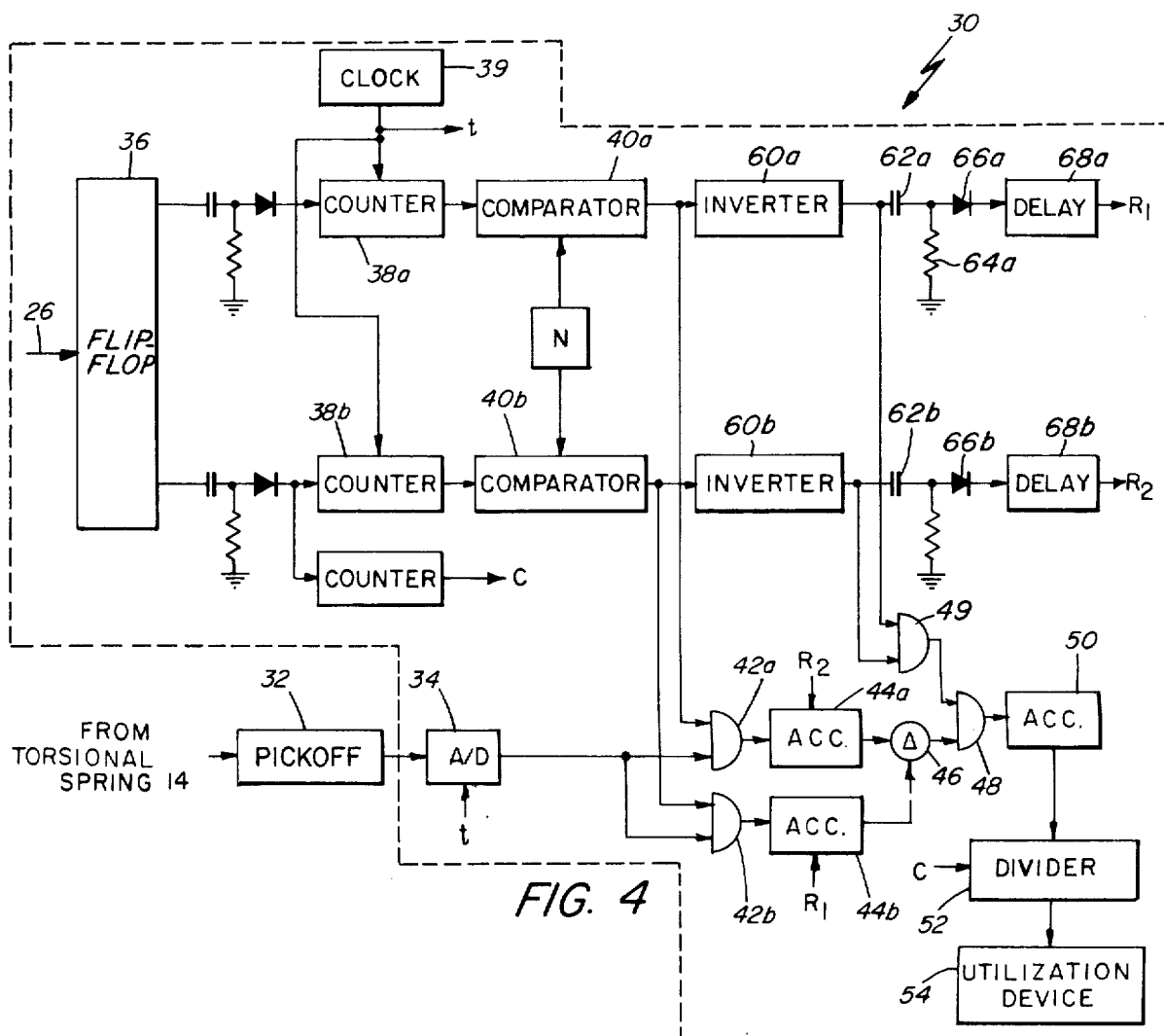
Figure 5:
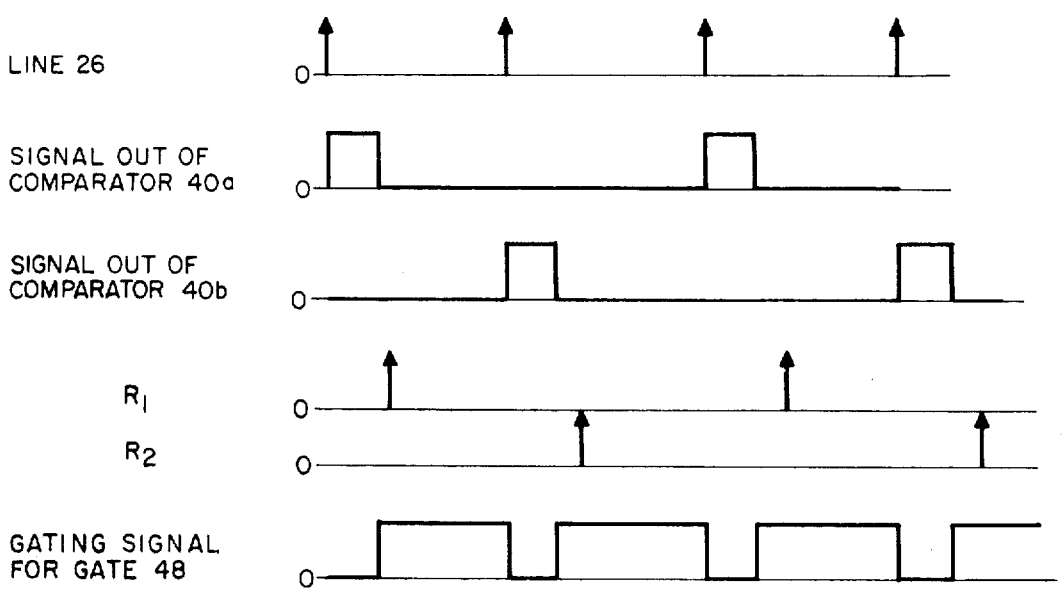

Referring now in detail to FIG. 4, processor 30 is shown to be actuated by means of pickoff 32 and line 26. The output signal produced by synchro 32 is digitized by A/D converter 34. Line 26 is connected to a flip-flop 36 such that, each time a pulse is transmitted on line 26, counters 38a and 38b are alternately initiated to count clock pulses from clock 39. Comparators 40a, 40b produce gating signals at their respective output terminals until the counters 38a, 38b respectively connected thereto have counted up to N. The value N represents the time it takes for input axis 22 (FIG. 1) to rotate through the angle $\theta$. The gating signals of such comparators 40a, 40b are applied to AND gates 42a, 42b, respectively, as shown. Also connected to gates 42a, 42b is the output of A/D converter 34. Every other time the input axis 22 (FIG. 1) is aligned with the reference direction 28, gate 42a is enabled for an interval of time to allow N samples of the pickoff signal levels 20 to pass through such gate and that each one-half revolution later gate 42b is similarly enabled to allow N samples to pass therethrough. The sampled pickoff signal levels passing through gate 42a are added in accumulator 44a and the sampled pickoff signal levers through gate 42b are added in accumulator 44b. In other words, if after N samples the number in either one of accumulators 44a, 44b were divided by N, the resultant number would represent the average pickoff signal level during the period of time in which the input axis 22 is rotated through the angle $\theta$ after having been codirectional with the reference direction 28. The difference between the sum of the precessional rates stored in accumulators 44a, 44b is determined by subtractor 46. Such difference is passed through AND gate 48 to accumulator 50 when there is no gating signal produced by either comparator 40*a* or 40*b*. The enabling signal for AND gate 48 is supplied by AND gate 49. The accumulator 44*a* is reset by means of reset pulse R₁, such reset pulse being developed a short time after the termination of the gating signal produced by comparator 40*b*, by means of inverter 60*b*, capacitor 62*b*, resistor 64*b*, diode 66*b* and delay line 68*b*, in a conventional manner. Similarly, accumulator 44*b* is reset by means of reset pulse R₁, such reset pulse being similarly developed a short time delay after the termination of the gating signal produced by comparator 40*a*. A timing diagram for processor 30 is shown in FIG. 5. Therefore, the signal stored in accumulator 50, after [being normalized by the number of full revolutions (by means of divider 52)], for a small angular deviation of the reference direction 28 from the east-west axis, E-W, is indicative of the azimuthal direction of such reference direction 28 from such axis. Utilization device 54, here a digital display means, is provided to present the angular deviation of the reference direction 28 from east-west.

While only one particular embodiment of the invention has been set forth and described, variations that fall within the principle of the invention will occur to those skilled in the art. For example, the input axis may be rotated in a plane other than a plane orthogonal to the local vertical because the difference signal stored in accumulator 50 will be zero when such input axis is aligned along the east-west axis E-W. For maximum sensitivity, however, it is preferable to maintain such plane orthogonal to the local vertical axis. It also follows that the principles of the invention may be readily used to determine the local vertical if true north were known a priori because the amplitude of the signal generated by pickoff 32 when the input axis 22 is aligned with the north-south axis is related to the angular deviation of the plane in which the input axis is rotated. Further, the orientation of spin axis 18 and output axis 20 may be reversed. Still further, the effect of high frequency drift and long term drift may be reduced by other techniques.

It is felt, therefore, that the invention should not be restricted to the proposed embodiment but rather should be limited only by the spirit and scope of the following claims.

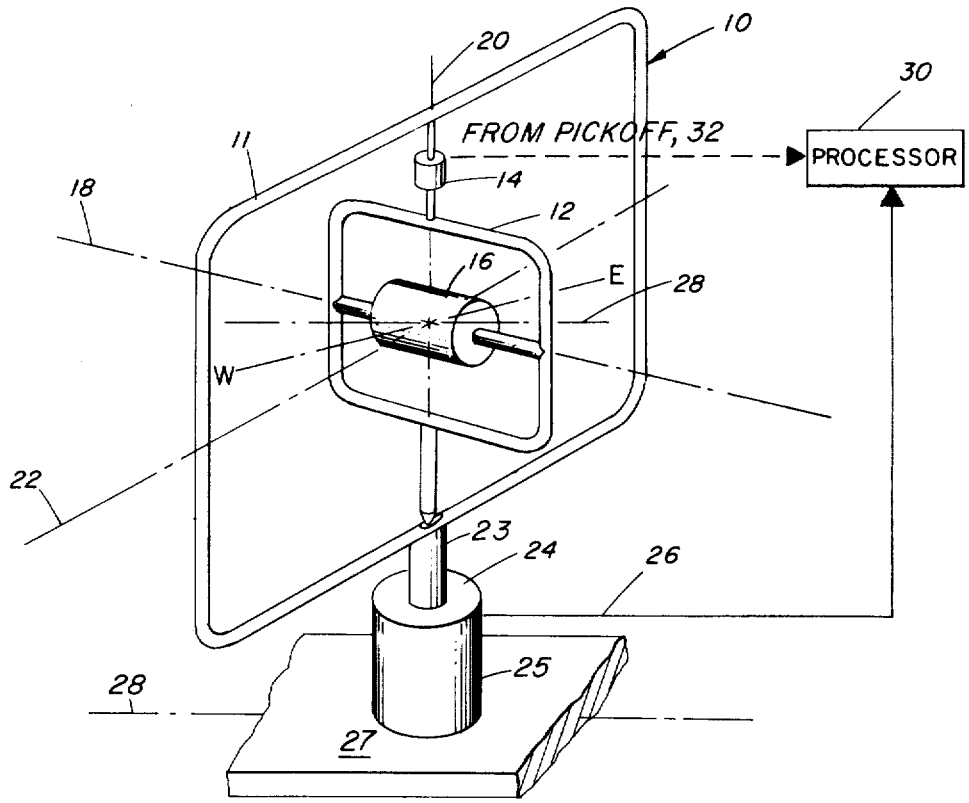

What is claimed is:

1. A method for determining the difference in direction between a reference direction and a direction related to the earth's rotational axis using gyroscopic apparatus, such apparatus having an input axis, a spin axis and an output axis, each one of such axes being orthogonal to the other two of such axes, comprising the steps of:
   a. continuously rotating, at a substantially constant rate, the input axis about the earth's vertical axis;
   b. measuring, as the input axis is rotated, the precessional rates and accompanying restraint torques at the output axis during successive periods of time in which the input axis is rotated through a predetermined angle after having been aligned with the reference direction; and
   c. determining the difference between the measured precessional rates and accompanying restraint torques at the output axis in successive ones of such periods of time, each such difference being indicative of the then existing difference in direction between the reference direction and the direction relative to the earth's rotational axis.

2. The method recited in claim 1 including the additional step of averaging successive differences in the measured precessional rates and accompanying restraint torques to eliminate the effect of drift of the gyroscopic apparatus.

3. The method recited in claim 1 wherein each successive period of time is the time during which the predetermined angle is less then 90°.

4. The method recited in claim 3 including the additional step of averaging successive differences in the measured precessional rate and accompanying restraint torque to eliminate the effect of drift in the gyroscopic apparatus.

5. The method recited in claim 1 wherein the input axis is rotated in a plane disposed in known relationship to the vertical axis.

6. The method recited in claim 5 wherein the input axis is rotated in a plane substantially orthogonal to such vertical axis.

7. The method recited in claim 2 wherein the input axis is rotated in a plane disposed in known relationship to the vertical axis.

8. The method recited in claim 7 wherein the input axis is rotated in a plane substantially orthogonal to such vertical axis.

9. The method recited in claim 4 wherein the input axis is rotated in a plane disposed in known relationship to the vertical axis.

10. The method recited in claim 9 wherein the input axis is rotated in a plane substantially orthogonal to such vertical axis.

* * * * *

UNITED STATES PATENT OFFICE
CERTIFICATE OF CORRECTION

Patent No. 3,936,948     Dated February 10, 1976

Inventor(s) George P. Maselli

It is certified that error appears in the above-identified patent and that said Letters Patent are hereby corrected as shown below:

Sheets 1 and 2 of the drawings should be deleted and substituted with the attached sheets of drawings therefor. The title page should be deleted and should appear as per attachment.

Signed and Sealed this

Eighteenth Day of April 1978

[SEAL]

Attest:

RUTH C. MASON
*Attesting Officer*

LUTRELLE F. PARKER
*Acting Commissioner of Patents and Trademarks*

United States Patent
Maselli

[11] 3,936,948
[45] Feb. 10, 1976

[54] METHOD FOR DETERMINING AZIMUTHAL DIRECTION RELATIVE TO TRUE NORTH

[75] Inventor: George P. Maselli, Chelmsford, Mass.

[73] Assignee: Raytheon Company, Lexington, Mass.

[22] Filed: Sept. 14, 1973

[21] Appl. No.: 397,558

Related U.S. Application Data

[63] Continuation of Ser. No. 175,854, Aug. 30, 1971, abandoned.

[52] U.S. Cl. .................................. 33/301; 33/324
[51] Int. Cl. ............................................ G01c 19/38
[58] Field of Search ............. 33/301, 324, 322, 318

[56] References Cited
UNITED STATES PATENTS

| | | | |
|---|---|---|---|
| 3,222,795 | 12/1965 | Gevas | 33/301 |
| 3,330,945 | 7/1967 | Gevas | 33/322 |
| 3,561,129 | 2/1971 | Johnston | 33/324 |
| 3,753,296 | 8/1973 | VanSteenwyk | 33/324 |

*Primary Examiner*—William D. Martin, Jr.
*Attorney, Agent, or Firm*—Richard M. Sharkansky; Philip J. McFarland; Joseph D. Pannone

[57] ABSTRACT

Disclosed herein is a method for determining azimuthal direction relative to true north using gyroscopic apparatus. The input axis of a gyroscope is rotated at a substantially constant rate about the local vertical axis. A series of precessional rates at the gyroscope's output axis is measured as the input axis rotates through a predetermined portion of each half revolution. The predetermined portion of each half revolution of the input axis is in known relationship to the heading or reference being determined. Each difference in successively measured ones of the series of precessional rates is filtered to reduce the effect of drift within the gyroscope and thereby accurately determine the azimuthal direction of such heading relative to true north.

10 Claims, 5 Drawing Figures